SEARCH ROOM

X 5348 N

NoDS

Nov. 18, 1952 S. A. SCHERBATSKOY 2,618,743

SYSTEM AND APPARATUS FOR DETERMINING THE LISTENING HABITS OF WAVE SIGNAL RECEIVER USERS

Filed Oct. 24, 1947 2 SHEETS—SHEET 1

FIG I

Inventor
Serge A. Scherbatskoy
By Mason & Wyss
Attys.

Inventor
Serge A Scherbatskoy
By
Mason & Wyss
Attys.

SEARCH ROOM

Patented Nov. 18, 1952 2,618,743

UNITED STATES PATENT OFFICE 2,618,743

SYSTEM AND APPARATUS FOR DETERMINING THE LISTENING HABITS OF WAVE SIGNAL RECEIVER USERS

Serge A. Scherbatskoy, Tulsa, Okla., assignor to A. C. Nielsen Company, Chicago, Ill., a corporation of Illinois Application October 24, 1947, Serial No. 781,987

3 Claims. (Cl. 250—2)

Figure 1:
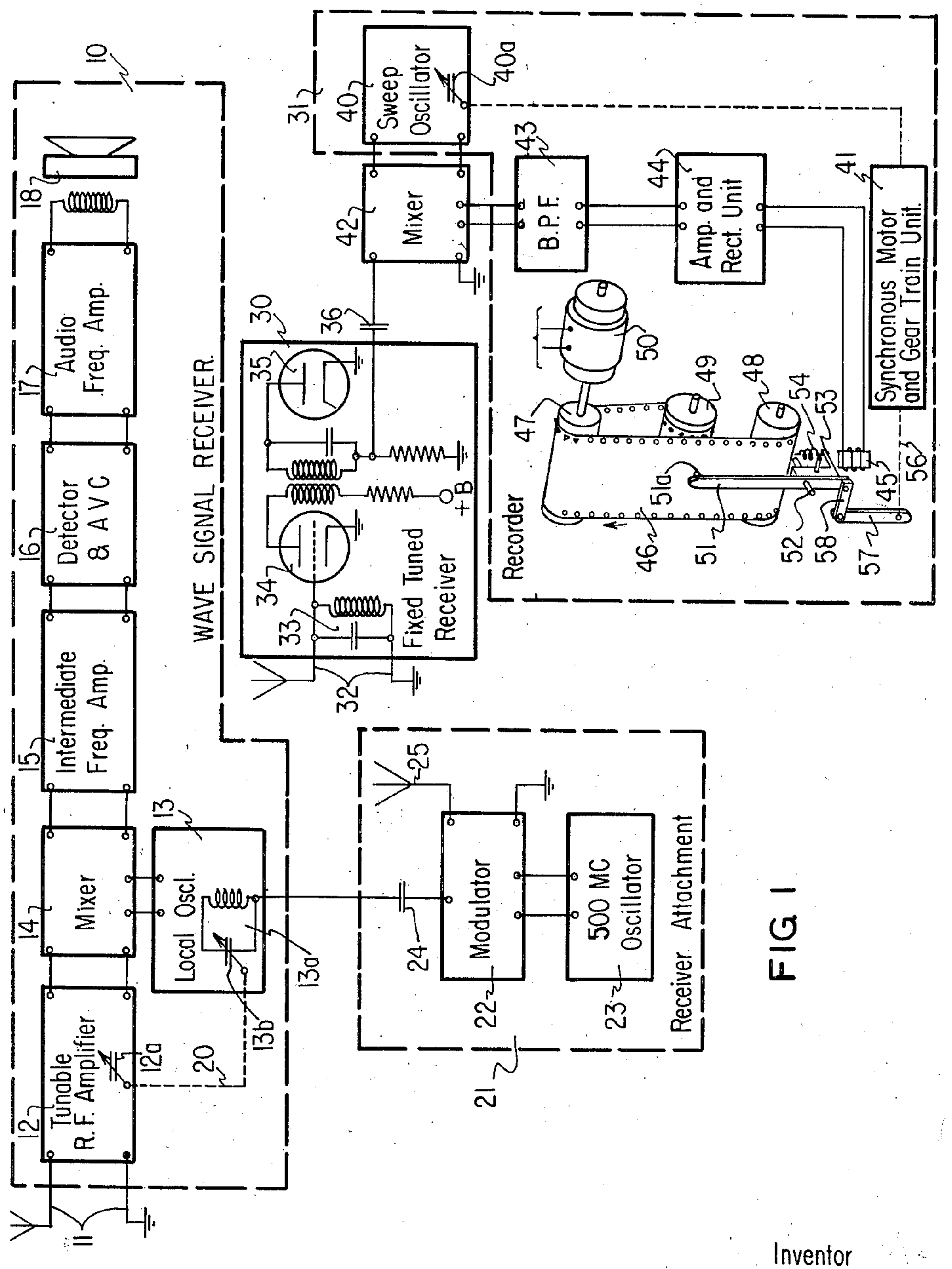

The present invention relates to systems and apparatus for determining the listening habits of wave signal receiver users and more particularly to an arrangement whereby the particular broadcasting stations to which a wave signal receiver is tuned may be known at a point remote from the receiver without any connections to the receiver.

In recent years it has become increasingly important for radio advertisers to be able to determine the listening habits of wave signal receiver users so as to analyze the effectiveness of radio advertising. At the present time numerous schemes are employed for this purpose which fall into two general types. One type includes schemes such as calling selected ones of the radio audience by telephone to determine what program they are listening to at the time of calling, employing post cards asking certain selected radio users to tell what stations they listened to the preceding night for example, or actually ringing the door bells of selected homes to determine what radio stations are being listened to. Each of these enumerated schemes has an obvious disadvantage in that the active cooperation of the radio user is required and furthermore many radio users would object to being called on the telephone, to answering the doorbell, or to filling in a post card supplied for this purpose.

The other type of schemes or methods for analyzing the listening habits of radio receiver users are generally referred to as instrumented methods and include the employment of suitable instruments for automatically recording the particular radio stations to which one or more wave signal receivers are tuned with respect to time. Most of these instrumented methods require only passive cooperation of the radio receiver user by permitting a suitable instrument to be associated with his radio receiver. Where the apparatus required at the receiver is of relatively small bulk so that it can be disposed within the receiver cabinet its use is such that the receiver user is generally unaware of its presence. Such instrumented schemes have numerous advantages over the other schemes set forth above based primarily on the fact that the human element in so far as the radio receiver user's collaboration is concerned is substantially eliminated. It will be understood that in any of the schemes enumerated above information can economically be obtained only from a limited number of homes and these homes are chosen so as to provide the desired cross section with respect to the various factors which normally affect a sample involving members of the public.

In instrumented methods of determining the listening habits of wave signal receiver users there has been a tendency to eliminate all precision apparatus from the vicinity of the radio receiver, and to position such precision apparatus at a remote recording point such as the basement or a closet of the wave signal receiver user's home or better still at a central station or central recording point completely removed from the home of the wave signal receiver being monitored, which central station, particularly in urban areas, may have means for recording the listening habits of numerous wave signal receiver users. Heretofore it has been the practice in installations where the precision recording apparatus is disposed outside the home of the wave signal receiver user to transmit the desired information between the home of the receiver user and the central station by means of leased wires or the like. It has been found that the expense of leasing wires for obtaining the desired sample in various areas is exceedingly high and it would be desirable to provide an arrangement whereby this information could be provided at a much lower cost while still retaining the advantages of a scheme wherein it is unnecessary to contact the home of the wave signal receiver user except to make the initial installation and occasionally to calibrate the apparatus.

Accordingly it is an object of the present invention to provide a new and improved arrangement for determining the listening habits of radio receiver users.

It is a further object of the present invention to provide an arrangement for determining the listening habits of radio receiver users wherein the information is instantaneously supplied to a central station remote from the receiver user's home without the requirement of leased lines and furthermore without causing interference in any way to other wave signal receiver users as well as the wave signal receiver being monitored.

Further objects and advantages of the present invention will become apparent as the following description proceeds and the features of novelty which characterize the invention will be pointed out with particularity in the claims annexed to and forming a part of this specification.

Figure 2:
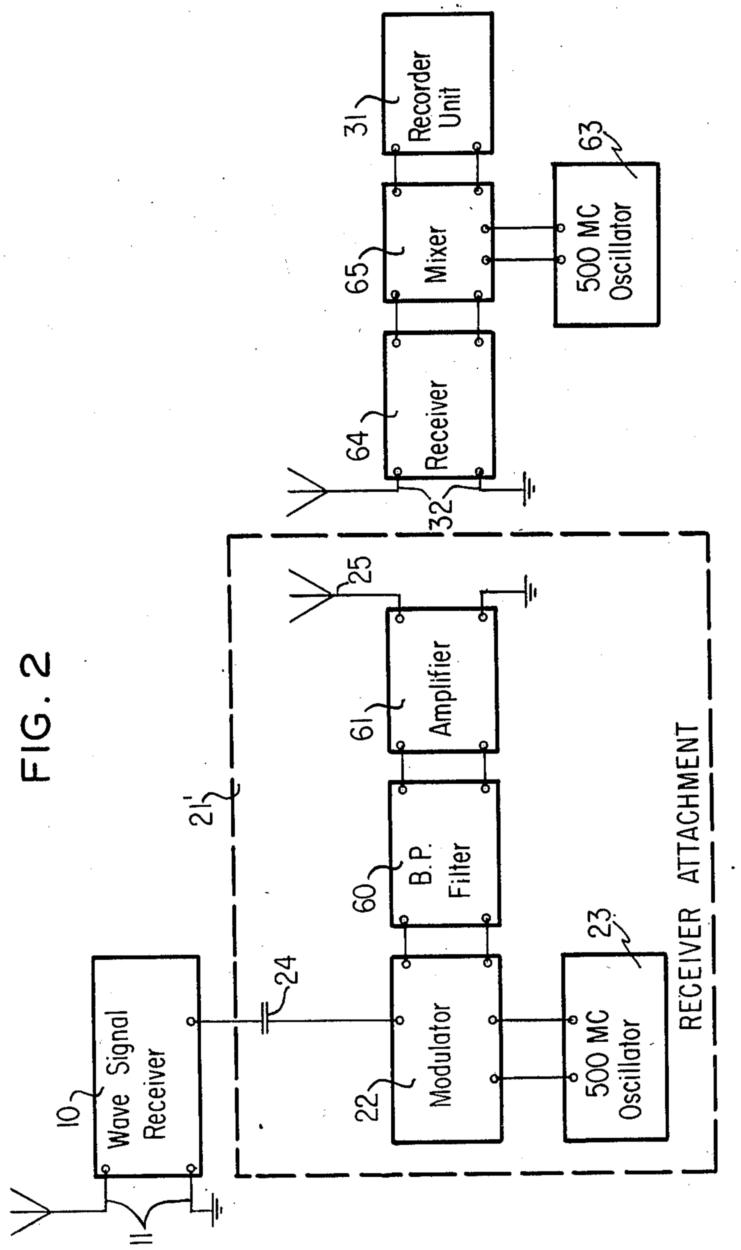

For a better understanding of the present invention reference may be had to the accompanying drawings in which:

Fig. 1 is a schematic diagram illustrating one embodiment of the present invention; and Fig. 2 is a similar schematic diagram illustrating another embodiment of the present invention.

It is a well-known fact that substantially all modern radio receivers in extensive use today are of the so-called superheterodyne type. By that is meant that the frequency of the incoming signal is changed to a new frequency, namely the intermediate frequency, which intermediate frequency is obtained by means of the heterodyne process. In other words the frequency is changed by combining the radio frequency with the output of an adjustable local oscillator generally referred to as the high frequency oscillator. The radio frequency signal and the output of the local oscillator are combined in a mixer or converter stage of the receiver often referred to as the first detector stage. To produce a particular frequency equal to the desired intermediate frequency such receivers usually employ a uni-control tuning arrangement. Whether the tuning arrangement comprises ganged condensers or permeability tuning such uni-control tuning comprises simultaneously variable reactances in several stages of the receiver including the local oscillator stage whereby the frequency of the local oscillator is changed as the frequency of the radio signal is changed to maintain constant the frequency of the intermediate frequency signal. The superheterodyne receiver has decided advantages in that the intermediate frequency signal obtained at the output of the mixer or first detector stage is constant regardless of the particular station to which the receiver is tuned, thus simplifying the amplification stages following the first detector stage. The presence of the local oscillators in wave signal receivers has caused a great many problems and radio manufacturers have literally spent millions of dollars in engineering development to cut down interference from the local oscillator not only in the particular receiver under consideration but also in adjacent receivers. Stringent regulations by the Federal Communications Commission apply to local oscillators of such receivers with reference to interference with adjacent receivers.

It will be understood by those skilled in the art that the local oscillator of a superheterodyne receiver produces a modulated signal which varies in frequency in dependence upon the particular radio station to which the receiver employing such local oscillator happens to be tuned. It will be apparent therefore that the frequency of the local oscillator provides an indication of the tuning condition of the receiver and the problem with which the present invention is concerned is the transmission of this local oscillator signal to a remote point without violating regulations of the Federal Communications Commission and without employing complicated arrangements such as shielded leased lines and the like.

Referring now to Fig. 1 of the drawings there is illustrated a wave signal receiver generally designated as 10. The present invention is concerned with determining the listening habits of users of the wave signal receiver 10 or wave signal receivers similar to the receiver 10. The particular construction of the receiver 10 is of no interest as far as the present invention is concerned except that it be of the superheterodyne type. As illustrated the wave signal receiver 10 comprises an antenna ground circuit 11, a radio frequency selector and amplifier unit or stage 12, a local oscillator 13, a mixer or converter stage 14 which may also be termed the first detector stage, an intermediate frequency amplifier stage 15, a detector and automatic volume control stage 16, an audio frequency amplifier stage 17 and a signal reproducer or loud speaker stage 18, which except for the local oscillator 13 are connected in tandem in the order named. The local oscillator 13 is connected to the mixer stage wherein the high frequency signal produced by the oscillator and the radio frequency signal received by the antenna-ground circuit 11 are mixed to produce a particular frequency which is constant regardless of the radio station to which the receiver is tuned. As illustrated in the drawings the local oscillator 13 includes a tuned circuit 13*a* including a variable reactance device. As illustrated the variable reactance device comprises a variable condenser 13*b* which is arranged to be operated with the condenser 12*a* of the radio frequency stage 12 for ganged operation as indicated by the interconnection 20. It will be understood that tuning of the wave signal receiver 10 to a particular transmitting station involves varying the capacitance of the condensers 12*a* and 13*b* and consequently varying the frequency of the local oscillator 13. For the standard broadcast band the frequency of the local oscillator 13 in conventional receivers usually varies over a range of 1,000 to 2,000 kc.

In accordance with the present invention there is provided at the wave signal receiver 10, a receiver attachment, generally designated as 21 which provides means for extracting an electrical characteristic representative of the particular frequency of the local oscillator 13. The receiver attachment 21 is preferably of such small bulk that it may be disposed in the available space of substantially any conventional receiver cabinet, so that as far as the receiver user is concerned he may be substantially unaware of the presence of the receiver attachment 21. The receiver attachment 21 in accordance with the present invention includes nonprecision apparatus in the sense that it will not be affected by ordinary jarring and movement to which the receiver 10 may normally be subjected, and as illustrated comprises a modulator unit 22 and an ultra high frequency oscillator 23 specifically illustrated as a 500 megacycle oscillator. By way of a specific embodiment of the present invention the 500 mc. oscillator 23 might comprise a 50-volt oscillator which supplies this voltage at a frequency of 500 mc. to the modulator unit 22. Also in accordance with the present invention there is extracted from the local oscillator 13 a voltage which might be of the order of $\frac{1}{20}$ of a volt at a frequency corresponding to that of the local oscillator. As illustrated the tuned circuit 13*a* of the local oscillator 13 is coupled by means of a coupling capacitor 24 having by way of example a rating of one micro-micro farad. With this arrangement it is apparent that an insignificant amount of local oscillator voltage is extracted which will not radiate to interfere with other receivers. Furthermore the ultra high frequency output of the oscillator 23 is modulated with a component whose frequency is directly related to that of the local oscillator 13. The output of the modulator unit 23 is connected to a transmitting antenna 25 so that effectively the receiver attachment 21 transmits a 500 mc. carrier modulated with the frequency of the local oscillator 13. In this ultra high frequency range the Federal Communications Commission is fairly liberal with its regulations and interference with adjacent receivers is not a problem. The ultra high frequency signal transmitted by the attachment 21 may be transmitted to a remote point in the home where the receiver 10 is located or it might be transmitted over a radius of several miles to a central station which central station could be a common central station for recording information regard-

SEARCH ROOM ing the listening habits of users of numerous wave signal receivers such as 10 which are located within the area. It should be understood that although the ultra high frequency oscillator 23 has been designated as a 500 mc. oscillator, some other frequency might equally well be employed preferably one for which a channel could readily be obtained from the Federal Communications Commission.

It has been mentioned above that the receiver attachment 21 would have a very small bulk and as illustrated could comprise only one or two tubes which if of the miniature type could be disposed in a unit of insignificant size.

For the purpose of producing a record of the tuning condition of the wave signal receiver 10 at a remote point such as a separate central station there is provided in accordance with the present invention a fixed tuned receiver generally designated at 30 associated with a recording unit 31. The fixed tuned receiver 30 is provided with an antenna ground circuit 32 which is connected to a fixed tuned circuit 33 tuned to the frequency of the oscillator 23 and as illustrated tuned to a frequency of 500 mc. The output of the tuned circuit is preferably supplied to an amplifier tube 34 which in turn is coupled to a detector stage comprising the tube 35 whereupon the modulation components with which the 500 mc. oscillations are modulated is detected and supplied to a suitable coupling capacitor generally designated at 36 which is connected to the recorder unit 31. It will be apparent that there has been provided a simple arrangement for producing at a remote point a signal which is representative of the frequency of the local oscillator 13 without the requirement of leased telephone lines or the like and without causing interference to adjacent radio receivers.

The recorder unit 31 may comprise any conventional recorder unit such as for example the unit disclosed and claimed in United States Letters Patent 2,305,834—Woodruff, assigned to the same assignee as the present application or copending Clark application, Serial No. 511,246 filed November 22, 1943 and also assigned to the same assignee as the present application. As illustrated the recorder 31 comprises a sweep oscillator unit 40 which is arranged to produce a variable output frequency which sweeps the same frequency range as the local oscillator 13. Preferably a variable reactance device such as is schematically designated at 40*a* in the form of a variable condenser is caused to sweep a particular frequency band such as the 1,000 to 2,000 kc. band by being drivingly connected to a synchronous motor and gear train unit 41 preferably causing the sweep oscillator to sweep the frequency spectrum at one revolution per minute. The output of the sweep oscillator 40 and the modulation components detected in the fixed tuned receiver 30 are supplied to a mixer unit 42 so as to produce a particular frequency output equal to the difference in frequencies between that of the local oscillator 13 and that of the sweep oscillator 40. As illustrated the output of the mixer unit 42 is supplied to a band pass filter 43 sharply tuned to pass frequencies of very narrow range which might for example be a 3 kc. band pass filter. Whenever the difference frequency between the local oscillator 13 and the sweep oscillator 40 is equal to 3 kc. a signal would be supplied to the output of the band pass filter 43 which is illustrated as being connected to an electromagnet 45 through an amplifier and rectifier unit 44.

As further illustrated the recording unit 31 includes a movable recording element generally designated at 46 and specifically illustrated as a movable tape driven by means of a sprocket 47 engaging marginal perforations in the tape 46. The tape 46 is movable from a supply spool 48 to a take up spool 49. Preferably the recording element 46 is moved at a constant speed with respect to time by means of a motor unit such as a synchronous motor 50 whereby distances longitudinally of the tape 46 will be directly indicative of elapsed time and with reference to a particular time base will be representative of a particular instance of time.

For the purpose of producing a record or trace on the movable recording element 46 there is provided a recording means in the form of an oscillating stylus 51 having an inscribing portion 51*a* adapted to move transversely of the recording element 46. As illustrated the stylus 51 is mounted for oscillating movement about a pivot 52 supported on an armature 53 pivotally mounted about an axis 54. Oscillation of the stylus 51 is obtained by means of a driving connection with a synchronous motor and gear train unit 41 including a shaft 56, a crank 57, and a link 58 interconnecting the crank 57 and the end of the stylus 51 remote from the inscribing portion 51*a*. It will be apparent that the stylus 51 will be positioned transversely of the movable recording element 46 in dependence upon the particular frequency output of the sweep oscillator 40. Since the band pass filter 44 will only permit a signal to pass when the frequency of the sweep oscillator 40 differs from the frequency of the local oscillator 13 by a predetermined amount, energization of the electromagnet 45 and consequent movement of the stylus 51 so that the inscribing portion 51*a* engages the removable recording element 46 will occur at a particular instant during the cycle when the frequency difference between the sweep oscillator 40 and the local oscillator 13 corresponds to the pass characteristic of the filter 43. In other words the transverse position of the stylus 51*a* with respect to the recording element 46 is indicative of the tuning condition of the wave signal receiver 10 and the recorder 31 can readily be calibrated so that the trace produced on the recording element 46 will indicate the tuning condition of the wave signal receiver 10 whenever it is turned on.

It should be understood that any other suitable form of recorder and recording element including magnetic recorders or the like might equally well be employed and the illustrated embodiment is by way of example only to provide a complete disclosure.

In view of the detailed description included above it will be apparent that there is provided a simple arrangement for transmitting without interference a signal representative of the frequency of the local oscillator of the wave signal receiver being monitored without the employment of leased wires and the like. The precision apparatus required for recording the desired information is entirely remote from the receiver and if the equipment such as the recorder 31 is remote from the home where the wave signal receiver 10 is located it is unnecessary for the field men to enter the home of the wave signal receiver user except occasionally for calibration purposes.

With the arrangement described above the signal transmitted from the receiver attachment 21 includes two side bands which sometimes might produce spurious responses. In Fig. 2 of the drawings there is illustrated another embodiment of the present invention in which the transmitted signal from the receiver attachment comprises only a single side band. The corresponding parts of Fig. 2 of the drawings are characterized by the same reference numerals as in Fig. 1. As illustrated the receiver attachment designated by the reference numeral 21′ is slightly more complicated than that shown in Fig. 1 of the drawings in that it requires a band pass filter 60 for removing one of the side bands. As illustrated the output of the modulator unit 22 instead of being connected to the transmitting antenna circuit 25 is connected to a band pass filter 60. Interposed between the output of the band pass filter 60 and the transmitting antenna 25 is an amplifier 61. It will be apparent that the signal transmitted by the receiver attachment 21′ of Fig. 2 is substantially the same as that transmitted by the receiver attachment 21 except that it comprises only a single side band.

In order to detect the modulation components with which the ultra high frequency signal is modulated at a point remote from the receiver the arrangement disclosed in Fig. 2 requires an ultra high frequency oscillator 63 which should preferably have identically the same frequency as the ultra high frequency oscillator 23. Instead of the fixed tuned receiver 30, a receiver 64 is provided which in effect comprises a tuned stage capable of passing the signal transmitted by the transmitting antenna 25. This signal is heterodyned in a mixer stage 65 with the output of the ultra high frequency oscillator 63 so as to remove the ultra high frequency component and retain at the input to the recorder unit 31 a component representative of the frequency of the local oscillator of the receiver 10. The arrangement disclosed in Fig. 2 is dependent for satisfactory operation upon accurate frequency control of the oscillators 23 and 63 whereas the arrangement shown in Fig. 1 is not. If the frequency of the oscillator 23 in Fig. 1 shifts slightly this will have no effect on detecting the modulation component since both side bands shift by an equal amount. In other words in the double side band arrangement an ultra high frequency component plus an unknown component and an ultra high frequency component minus an unknown component are supplied whereby the ultra high frequency components are cancelled out leaving only the unknown. In the single side band arrangement it is necessary to generate at the receiving point an ultra high frequency exactly equal to the ultra high frequency to which the unknown quantity is added or subtracted in order to get rid of the ultra high frequency component.

It will be apparent to those skilled in the art that the present invention is not limited to the particular construction shown but that changes and modifications may be made without departing from the spirit and scope of the present invention, and it is aimed in the appended claims to cover all such changes and modifications.

What is claimed as new and desired to be secured by Letters Patent of the United States is:

1. Apparatus for producing an indication of the tuning condition of a wave signal receiver of the type including a local oscillator, comprising a receiver attachment closely associated with said receiver including an ultra high frequency oscillator, means for extracting from said receiver a variable frequency electrical quantity representative of the variable frequency output of said local oscillator of said receiver, means for modulating the output of said ultra high frequency oscillator with said variable frequency electrical quantity to produce a modulated signal, means for transmitting said modulated signal, means for receiving and demodulating said signal, and movable indicating means actuated in response to the modulation components of said signal.

2. In a device for producing an indication of the tuning condition and consequently an indication of the listening habits of users of a superheterodyne wave signal receiver, a receiver attachment including a 500 megacycle oscillator closely associated with said receiver, means including a capacitor for extracting a variable frequency voltage representative of the variable frequency output of the local oscillator of said receiver, means for modulating the output of said 500 megacycle oscillator with said voltage to produce a modulated signal, means for transmitting said modulated signal, means remote from said receiver for receiving and demodulating said signal, and movable indicating means actuated in response to the modulation components of said signal.

3. In a system for producing a record with respect to time of the tuning condition and consequently a record of the listening habits of users of a wave signal receiver of the type including a local oscillator, the combination of a receiver attachment associated with said receiver including a first high frequency oscillator, means for extracting from said receiver a variable frequency voltage representative of the output of said local oscillator, means for modulating the output of said first high frequency oscillator with said variable frequency voltage to produce a modulated signal, filter means for removing one of the side bands from said modulated signal, means for transmitting said modulated signal, means remote from said receiver including a second high frequency oscillator having an output identical in frequency with said first high frequency oscillator for detecting the modulation components of said signal, and movable indicating means actuated in response to said modulation components.

SERGE A. SCHERBATSKOY.

REFERENCES CITED

The following references are of record in the file of this patent:

UNITED STATES PATENTS

| Number | Name | Date |
|---|---|---|
| 1,990,489 | Hopkins | Feb. 12, 1935 |
| 2,188,165 | Thomas | Jan. 23, 1940 |
| 2,211,010 | Hallmark | Aug. 13, 1940 |
| 2,213,886 | Potter | Sept. 3, 1940 |
| 2,249,324 | Potter | July 15, 1941 |
| 2,284,747 | Koch | June 2, 1942 |
| 2,344,562 | Potter | Mar. 21, 1944 |
| 2,418,750 | Bliss et al. | Apr. 8, 1947 |
| 2,436,846 | Williams | Mar. 2, 1948 |
| 2,459,461 | Shankweiler et al. | Jan. 18, 1949 |
| 2,466,532 | Carlson | Apr. 5, 1949 |
| 2,475,176 | Chia-Lin Yuan | July 5, 1949 |
| 2,552,585 | Rahmel | May 15, 1951 |